May 26, 1970     A. I. WAKEFIELD     3,514,102

OCCUPANT PROPELLED, ENCLOSED ROUNDABOUT

Filed Feb. 28, 1966     3 Sheets-Sheet 1

Ardell I. Wakefield
INVENTOR.

BY *Alonzo A. O'Brien*
and *Harvey B. Jackson*
Attorneys

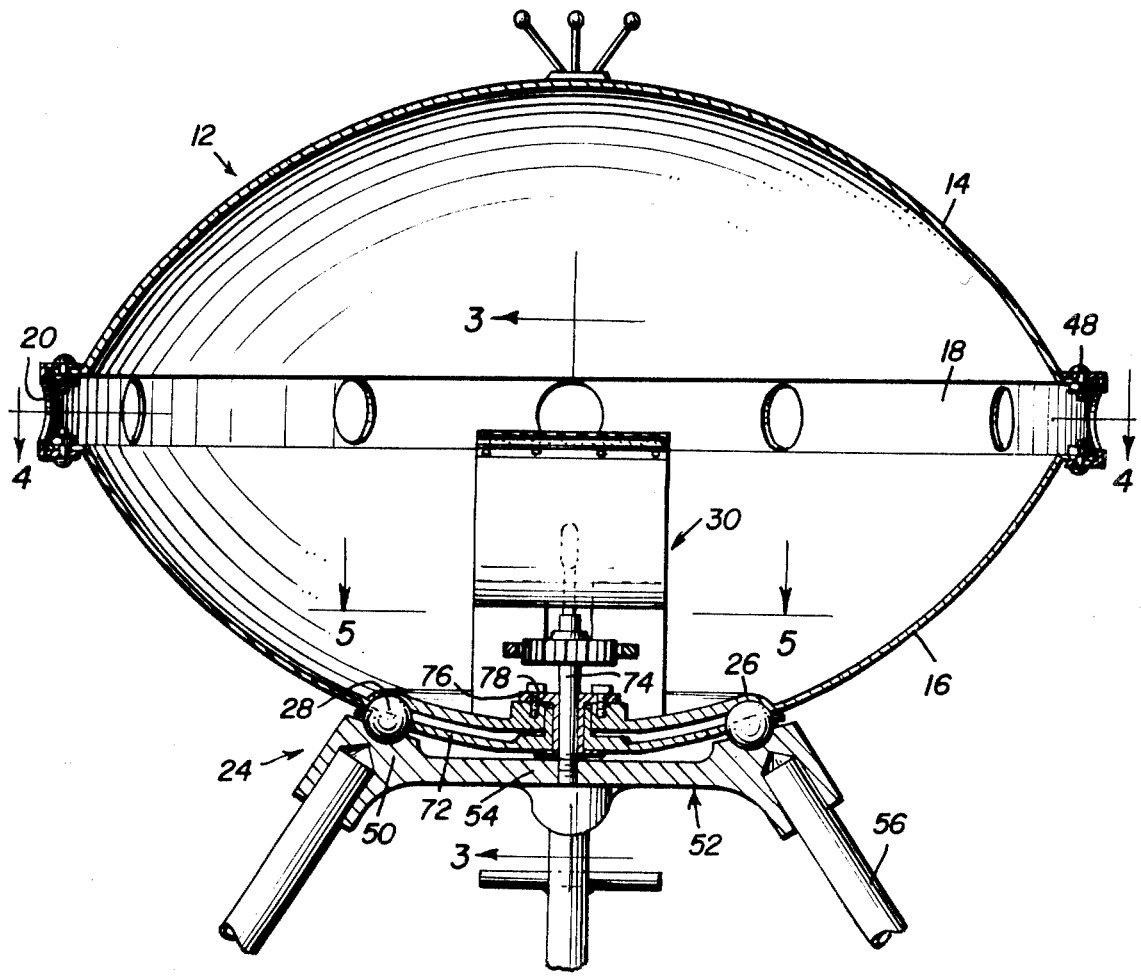

May 26, 1970   A. I. WAKEFIELD   3,514,102
OCCUPANT PROPELLED, ENCLOSED ROUNDABOUT
Filed Feb. 28, 1966   3 Sheets-Sheet 3

Ardell I. Wakefield
INVENTOR.

United States Patent Office 3,514,102
Patented May 26, 1970

3,514,102
OCCUPANT PROPELLED, ENCLOSED
ROUNDABOUT
Ardell I. Wakefield, Eugene, Oreg. (17 E. Gainsborough
Road, Thousand Oaks, Calif. 91360)
Filed Feb. 28, 1966, Ser. No. 530,649
Int. Cl. A63g 1/12
U.S. Cl. 272—33                                        1 Claim

ABSTRACT OF THE DISCLOSURE

An enclosure shell rotatably mounted by a bearing member supported in an elevated position above the ground by legs, at least one of which is provided with ladder rungs so as to provide access to the enclosure through a door in its lower floor portion. Seats are centrally mounted on the floor portion above the bearing member enclosing a propelling drive mechanism operated by the occupant by oscillation of a lever projecting upwardly from the seats.

---

This invention relates to amusement devices for children and more particularly to an elevated shelter capable of being rotated by its occupants.

A primary object of the present invention is to provide an amusement device suitable as playground equipment capable of combining the attributes of several other types of apparatus which are exciting and entertaining to youngsters. In particular, the apparatus of the present invention will provide youngsters with the entertainment and excitement usually experienced in connection with tree houses and space flight simulating apparatus.

It is therefore a further object of the present invention to provide an elevated enclosure which may be formed in an appropriate shape such as a "flying saucer," a space capsule, a rocket missile, etc. capable of being safely and firmly supported in an adjusted position above the ground and rotated about a substantially vertical rotational axis by the occupants without any external driving mechanism.

An additional object in accordance with the foregoing objects, is to provide a rotating enclosure capable of being rotated about a rotational axis by one or more oscillating levers drivingly connected to a ratchet gear centrally positioned within the enclosure.

In accordance with the foregoing objects, the apparatus of the present invention will be particularly suitable for densely populated urban regions having limited recreational areas and a scarcity of large trees. The elevated enclosure of the present invention will therefore serve as a substitute for tree houses while the facilities for rotating the enclosure will further enhance its enjoyment.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a sectional view taken substantially through a plane indicated by the section line 2—2 in FIG. 1;

FIG. 3 is a partial sectional view taken substantially through a plane indicated by section line 3—3 in FIG. 2;

Figure 1:
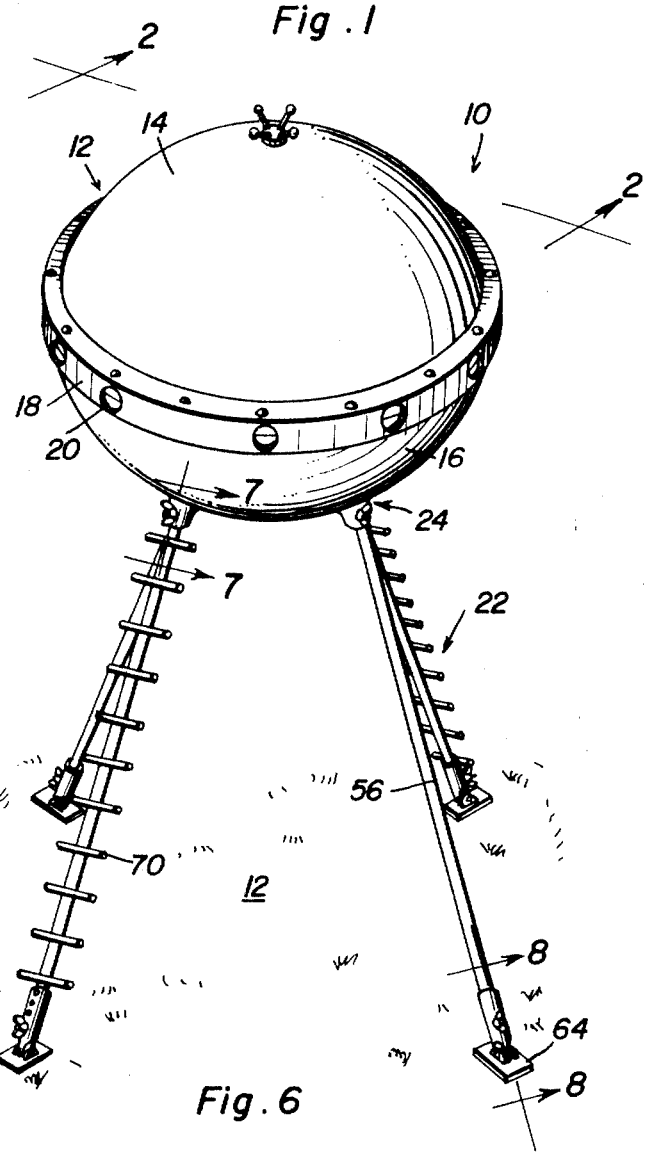
FIG. 1 is a perspective view of the amusement device of the present invention.

Referring now to the drawings in detail, FIG. 1 illustrates the apparatus of the present invention generally denoted by reference numeral 10 as being firmly mounted on a suitable ground 12. The apparatus includes an enclosure, generally referred to by reference numeral 12 which may in any appropriate shape such as the "flying saucer" configuration illustrated. The enclosure therefore includes an upwardly curved upper portion 14 and a downwardly curved, lower floor portion 16, the upper and lower portions being interconnected by an annular spacing channel 18 having a plurality of circumferentially spaced windows 20 formed therein. The enclosure 12 is supported in its elevated position above the ground by means of a structural supporting assembly 22 and bearing assembly 24 accommodating rotation of the enclosure about a substantially vertical rotational axis.

Figure 4:
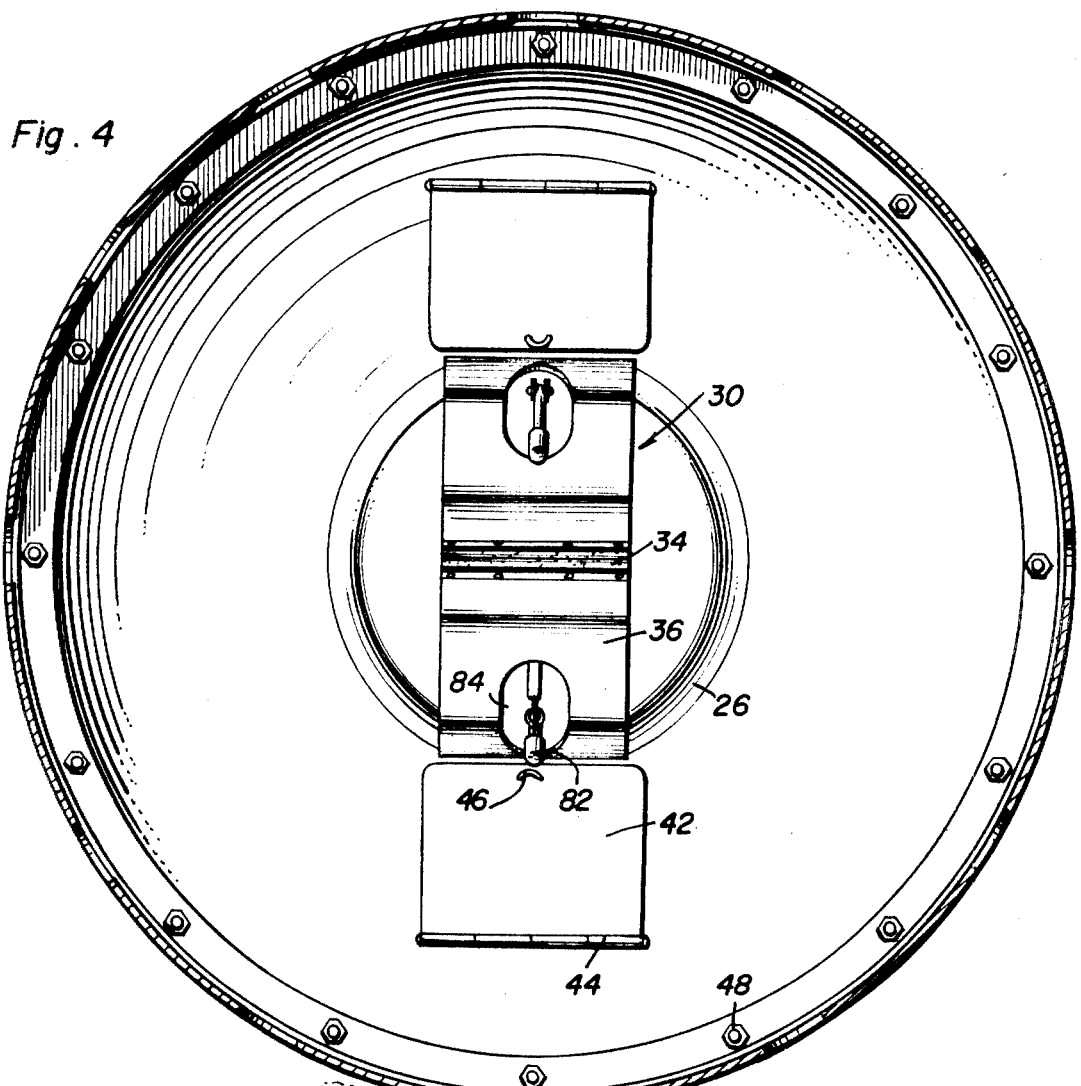
FIG. 4 is a sectional view taken substantially through a plane indicated by section line 4—4 in FIG. 2.

As shown in FIGS. 2 and 3, the lower portion 16 of the enclosure is provided with a circular track section 26 formed about the rotational axis. The track section receives a plurality of ball bearing elements 28 supported by the bearing assembly 24 so as to rotationally support the enclosure for rotation. Also mounted within the lower portion 16 and extending diametrically across the circular track section 26 is a seat assembly 30. The seat assembly includes a pair of seat backs 32 interconnected at their upper ends by a flexible strap 34, each seat back being connected to a seat portion 36 having a downwardly extending foot portion 38 secured to the floor of the lower portion 16. An access opening 40 is formed within the floor of the lower portion 16 adjacent to each of the foot portions 38 of the seat assembly with an access door 42 closing the opening. Accordingly, each of the doors 42 may be hingedly mounted by the hinges 44 on that side of the opening remote from the seat and provided internally with a handle 46 by means of which the occupant may open the door in order to exit from the enclosure. The vertical height of the lower portion 16 may be such that the occupants seated on the seat assembly 30 will be in a proper position for viewing through the windows 20 formed in the annular spacer element 18. The spacer element is secured by the fastener assemblies 48 to the annular, confronting flanges formed on the lower and upper portions 16 and 14 of the enclosure as more clearly seen in FIGS. 2 and 4.

Figure 7:
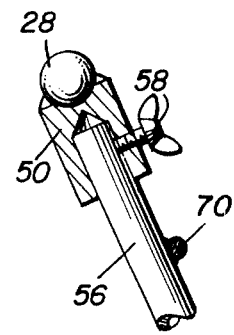
FIG. 7 is an enlarged partial sectional view taken substantially through a plane indicated by section line 7—7 in FIG. 1.
Figure 8:
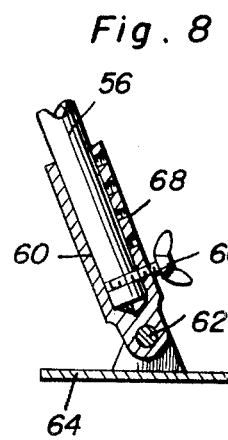
FIG. 8 is an enlarged partial sectional view taken substantially through a plane indicated by section line 8—8 in FIG. 1.
Figure 6:
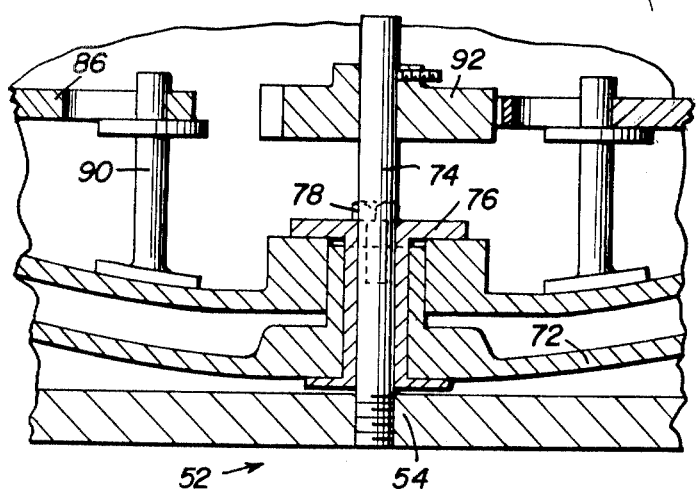
FIG. 6 is an enlarged partial sectional view taken substantially through a plane indicated by section line 6—6 in FIG. 5.
Figure 5:
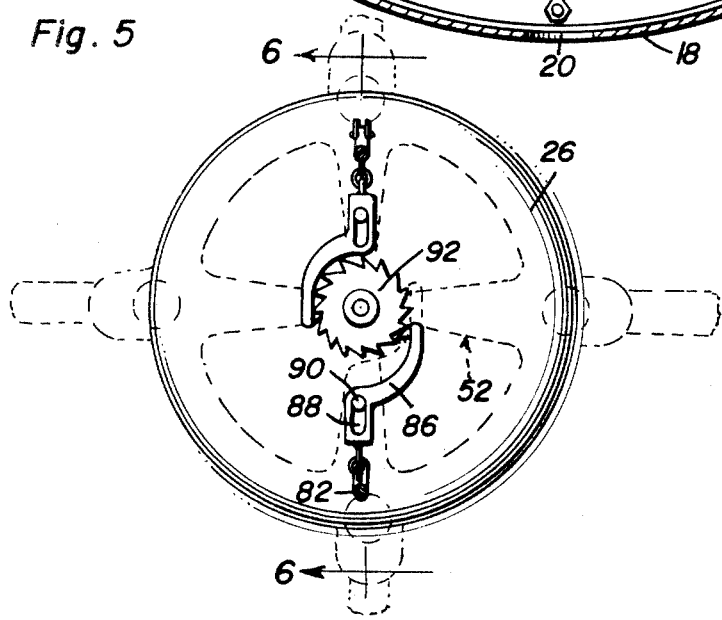
FIG. 5 is a partial sectional view taken substantially through a plane indicated by section line 5—5 in FIG. 2.

With continued reference to FIGS. 2, 3 and 5, it will be observed that each of the ball elements 28, four of such elements being shown in the illustrated embodiment, are supported within downwardly diverging socket portions 50 of a support spider member 52 also having a central guide portion 54 through which the rotational axis of the enclosure extends. The bearing suport member 52 is fixedly positioned above the ground in a substantially horizontal or adjustably tilted position by means of the supporting assembly 22 including a plurality of legs or rods 56, the upper end of each leg being received within the downwardly diverging socket portions 50 of the spider member 52 so as to be aligned along axes intersecting at the rotational axis of the enclosure. The legs are therefore releasably secured to the socket portions 50 by wing nut elements 58, for example, as more clearly seen in FIG. 7. The lower ends of the legs 56 are received within and adjustably secured to tubular sockets 60 as more clearly seen in FIG. 8, each tubular socket being pivotally connected by a pin 62 to a ground engaging foot element 64. It will therefore be apparent that the legs 56 may be adjustably connected to the foot elements 64 by means of the removable anchor pins 66 received through one of the plurality of apertures 68 formed in the tubular socket member 60. The position of the bearing support member 52 is thereby adjusted in order to rotationally support the enclosure 12 for rotation about a substantially vertical axis or an axis which is tilted at some angle to the vertical within safe limits. One or more of the legs 56 may also be provided with ladder rungs 70 so that youngsters may ascend or descend the legs in order to enter or exit from the enclosure through the access openings 40. Also associated with the bearing assembly 24, is a bearing ring 72 concentrically positioned about a guide shaft 74 secured to the support member 52 extending upwardly into the lower portion of the enclosure along the rotational axis. The lower portion 16 of the enclosure is therefore provided with an opening at the center of the circular track section 26 through which the guide shaft 74 extends. The bearing ring 72 is held assembled in concentric relations to the guide shaft 74 and the opening within the circular track section 26, by means of a pipe flange 76, as more clearly seen in FIG. 6, the flange 76 being secured by the fastener bolts 78 to the circular track section of the lower housing portion. It will therefore be apparent that the enclosure is rotationally supported in radially spaced relation to the guide shaft 76 about which it rotates with an amount of frictional freedom dependent upon the axial pressure exerted by the fasteners 78.

Mounted within the lower portion of the housing below the seat assembly 30 and secured to the bearing assembly by means of the guide shaft 74, is a drive mechanism generally denoted by reference numeral 80. The drive mechanism is operated by the enclosure occupants through a pair of propelling levers 82 pivotally mounted on the track section of the lower enclosure floor and projecting through slots 84 formed in each of the seats as more clearly seen in FIG. 3. Each of the propelling levers is pivotally connected to a driving pawl 86 having a guide slot 88 receiving a guide pin 90 secured to the floor of the lower enclosure portion. Accordingly, oscillation of each propelling lever 82 will reciprocate a drive pawl, the driving end of which is in engagement with a ratchet gear 92 as more clearly shown in FIG. 5. The ratchet gear is fixedly secured to the upper end portion of the guide shaft 74 so that reciprocation of the drive pawl 86 in one direction will cause the enclosure to be rotated in one direction, reciprocation of the driving pawl in the opposite direction overrunning the ratchet gear. Therefore, the enclosure occupants may impart rotation to the enclosure without any external drive facilities. Once the enclosure is rotating at a substantial speed, the occupants may release the propelling levers 82 so that the enclosure may continue to rotate with the driving pawls overrunning the ratchet gear 92 because of their pivotal mounting about the guide pins 90. By adjusting the pressure applied through the fasteners 78 the freedom with which the enclosure is rotated about the rotational axis established through the guide shaft 74 may be regulated as as aforementioned.

From the foregoing description, the construction, operation and utility of the amusement device of the present invention will be apparent. When installed, a child may enter the enclosure by climbing the legs 56 on which the ladder rungs 70 are mounted and entering the enclosure by pushing upwardly on one of the doors 42. Upon entering the enclosure the occupants will then be in a position to seat themselves on the seat assembly 30 and look out of the enclosure through the viewing windows 20. By grasping the propelling levers 82, the occupants may propel the enclosure about its rotational axis. The drive mechanism 80 through which the enclosure is rotated will also be protectively disposed below the seat assembly so as to avoid injury. It will also be appreciated that in addition to the "flying saucer" shape of the enclosure, other shapes could be adopted such as a rocket missile and that additional equipment such as instrument panels and controls may be mounted within the enclosure.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A rotatable amusement shelter comprising an enclosure, bearing means rotatably mounting the enclosure for rotation about a rotational axis, supporting means fixedly mounting the bearing means in an elevtaed position above the ground, and propelling means mounted within the enclosure and connected to the bearing means for rotating the enclosure about said rotational axis, said enclosure including an upper portion, a lower portion, annular spacing means interconnecting the upper and lower portions and having a plurality of windows mounted therein, occupant supporting seat means mounted in the lower portion above the bearing means and at least one access door mounted in the lower portion radially spaced from the bearing means relative to the rotational axis, said bearing means comprising a bearing support member, a plurality of bearing elements rotatably mounted by the support member and received within a circular track formed in the lower portion of the enclosure, and guide means fixedly mounted on the support member and extending into said lower portion of the enclosure along said rotational axis, said supporting means comprising a plurality of elongated legs connected to the bearing means and diverging downwardly therefrom along axes intersecting at the rotational axis, ground engaging means adjustably connected to the legs for adjustably positioning the rotational axis, and ladder rungs mounted on at least one of the legs, said propelling means comprising a ratchet gear connected to the guide means within the seat means, an actuating lever pivotally mounted in the enclosure and projecting upwardly through the seat means, and driving pawl means drivingly connecting the actuating lever to the ratchet gear for rotating the enclosure in response to oscillation of the actuating lever by an occupant within the enclosure.

References Cited

UNITED STATES PATENTS

| 709,462 | 9/1902 | Bollinger | 272—48 |
|---|---|---|---|
| 2,556,552 | 6/1951 | Patten | 272—33 |
| 2,560,703 | 7/1951 | Sebel | 272—33 |
| 2,912,244 | 11/1959 | Carr | 272—46 X |
| 3,135,057 | 6/1964 | Nelson et al. | |
| 994,444 | 6/1911 | Dammling | 272—36 |
| 2,927,746 | 3/1960 | Mellen. | |

FOREIGN PATENTS 469,653   11/1950   Canada.

ANTON O. OECHSLE, Primary Examiner

A. W. KRAMER, Assistant Examiner

U.S. Cl. X.R.

272—46